Jan. 17, 1939.　　　　F. STREICH　　　　2,144,467
DOUGH TWISTING MACHINE
Filed Feb. 16, 1938　　　2 Sheets-Sheet 2
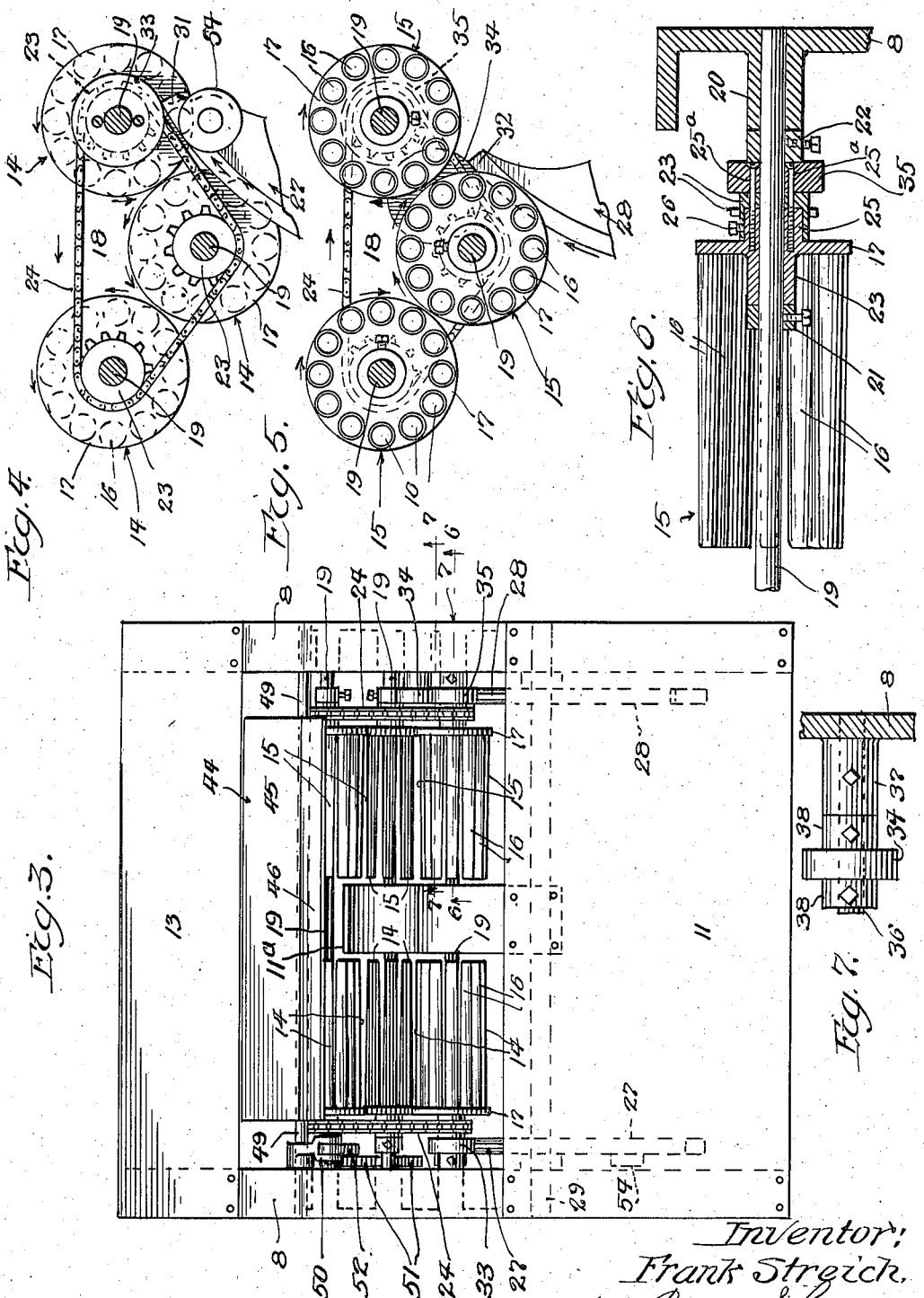

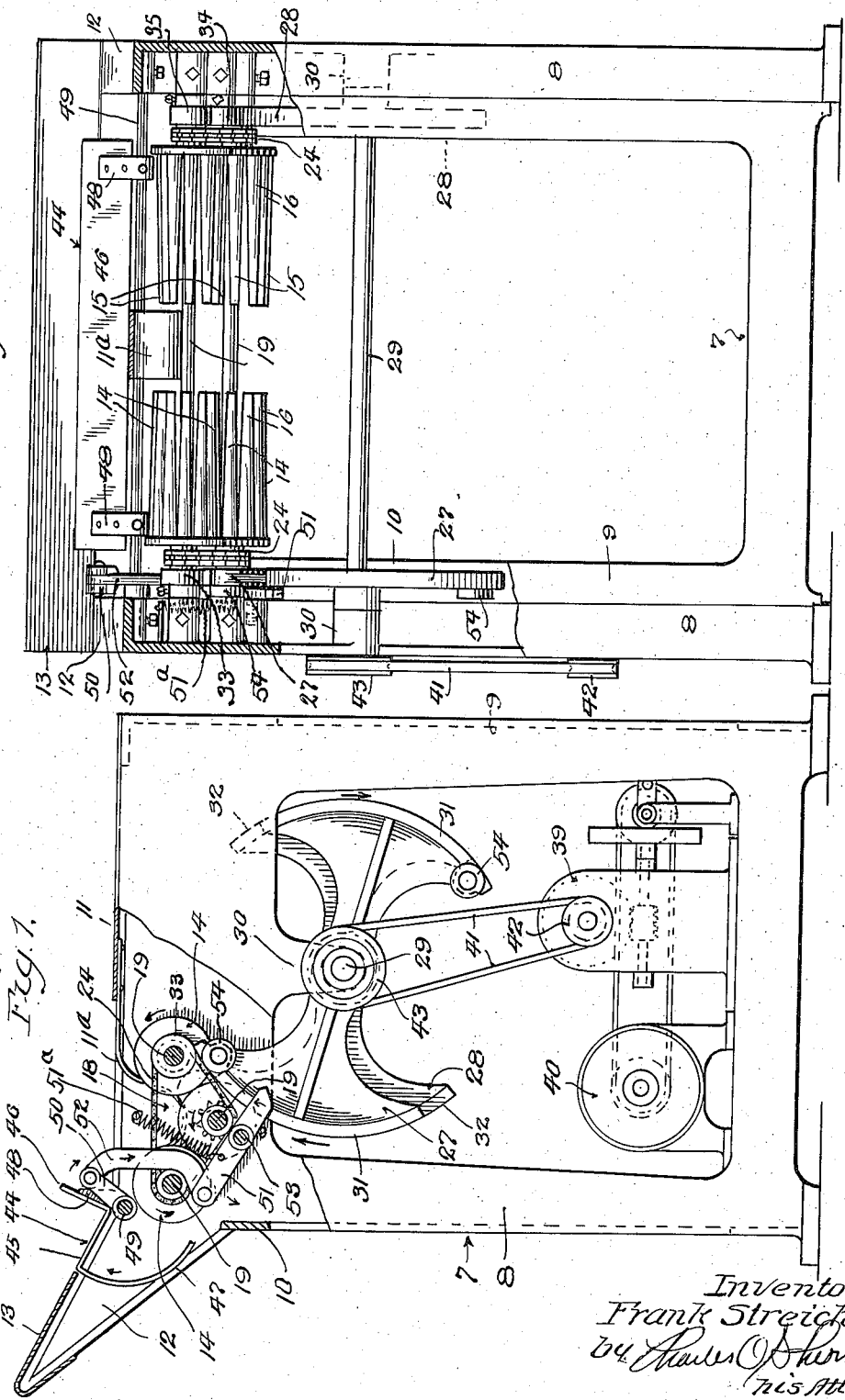

Patented Jan. 17, 1939

2,144,467

UNITED STATES PATENT OFFICE 2,144,467

DOUGH TWISTING MACHINE

Frank Streich, Chicago, Ill., assignor of one-third to Caleb H. Canby, Jr., and one-third to H. Hoyt Thompson, both of Chicago, Ill.

Application February 16, 1938, Serial No. 190,809

6 Claims. (Cl. 107—8)

This invention relates to dough twisting machines and its principal object is to provide improved means for twisting together two or more molded rolls of dough before they are placed in a pan. In my experience I have found that the use of rotating rollers is particularly desirable for twisting together rolls of dough, but some difficulty has been encountered in preventing the ends of the twisted dough rolls from untwisting before they are placed in the pan. This appeared to be because the twisted rolls of dough when discharged from the twisting members, fell upon a table or belt.

One of the objects of the present invention is to provide dough twisting mechanism in which the rollers or other twisting elements rotate about stationary or fixed axes to perform the twisting operation and remain quiescent for a short interval after the twisting operation has been completed, thereby enabling an attendant to manually remove the twisted-together rolls of dough and place the same in a pan, and also permitting certain gate mechanism to deliver untwisted rolls of dough to the twisting mechanism.

Another object is to provide driving means for the twisting mechanism, serving, during each cycle of operation, to rotate the twisting elements through a predetermined number of revolutions, then permitting the twisting elements to remain quiescent for a predetermined length of time, during which interval the twisted rolls are manually removed, and the driving means operates a certain gate which delivers two or more untwisted dough rolls to the twisting elements before the latter are again rotated.

The invention consists of several novel featuers hereinafter fully set forth and claimed.

The invention is clearly illustrated in the drawings accompanying this specification in which:

Fig. 1 is a side elevation of a dough twisting machine embodying a simple form of the present invention with one of the side frame members partly broken away to illustrate parts which would otherwise be concealed from view.

Fig. 2 is a front elevation of the machine shown in Fig. 1 with part of the front cross frame member broken away and part of the side frame members shown in vertical cross section.

Fig. 3 is a plan of the machine.

Fig. 4 is an enlarged, detail side elevation of one of the sets of dough twisting members employed.

Fig. 5 is an enlarged, detail, side elevation of the other set of dough twisting members.

Fig. 6 is an enlarged, detail, vertical cross section taken on the line 6—6 of Fig. 3.

Fig. 7 is an enlarged, detail, vertical cross section taken on the line 7—7 of Fig. 3.

The present invention is somewhat in the nature of an improvement upon the dough twisting machine shown and described in my prior Patent No. 2,090,379 issued August 17, 1937, for an improvement in dough twisting machines.

Referring to the accompanying drawings, the reference character 7 designates the supporting frame of the machine which, desirably, is of rectangular form comprising two side frame members 8, a front cross frame member 9 and a rear cross frame member 10 connecting the side frame members. Extending across the top of the frame near the front thereof is a rectangular sheet metal piece 11, which forms a table upon which may be placed pans to receive the twisted dough rolls. The side frame members are provided with upwardly and rearwardly extending arms or projections 12, upon the upper inclined edges of which is secured a sheet metal apron 13 upon which the untwisted dough rolls are delivered from a molding machine as is customary. A gate 44 is provided at the lower end of the inclined apron, which gate serves to hold dough rolls back until the proper time for delivering two or three of them at a time, as the case may be, to the twisting elements of the machine, as will be hereinafter explained.

As in the prior patent above referred to, two sets of oppositely disposed, rotatory dough twisting members 14, 15, are employed for twisting the dough rolls. In the present machine, however, the several dough twisting members are mounted to rotate upon fixed or stationary axes and have no bodily movement through any orbit as in the machine of my prior patent.

The dough twisting members may be in the form of solid or hollow rollers, if desired, as shown in my prior patent, but as a preference, the rollers are each formed of a series of circumferentially disposed fingers 16 preferably tapered and projecting from a disclike end wall 17. The fingers are placed quite close together and serve to take hold of the dough rolls more forcibly in twisting them one upon the other.

There are three dough twisting rollers in each set, two being separated and arranged in the same horizontal plane while the third member is disposed below the gap formed between the other two members, thus forming to all intents and purposes a trough 18 (see Figs. 1, 4 and 5) in which the dough rolls are twisted.

The rollers of each set are disposed in alignment with the corresponding rollers of the opposite set and in the operation of the machine, the dough twisting rollers of one set are rotated in one and the same direction and the dough twisting rollers of the opposite set are rotated in the opposite direction.

Supported by the table 11 and extending in the gap between the two sets of twisting rollers is a bent-up plate 11ª which conforms to the shape of the trough and forms a support for the parts of the dough rolls that are unsupported by the twisting rollers.

Desirably, the dough twisting rollers are formed with hubs 23, 25 by which they are rotatively mounted upon rods 19 which are secured in bosses 20 usually cast as parts of the side frame members 8. Each dough twisting member is held against lengthwise movement on its rod 19 by washers 21, 22 (see Fig. 6) secured upon the rod by set screws. The dough twisting members may be held in any position of adjustment along the length of the rod 19 by the collars 21, 22.

Gearing is provided between the several dough twisting rollers of each set for causing them to rotate in unison in one and the same direction. Said gearing, as shown, comprises sprocket wheels 23 fastened to the dough twisting rollers, and a sprocket chain 24 trained over the sprocket wheels as shown in Figs. 1 and 4. The sprocket wheels are secured upon the hubs 25 of the rollers by set screws 26.

Secured to one dough twisting roller of each set is a friction roller, designated by 33 in one case and by 35 in the other. Each friction roller may be fastened to the hub of the dough twisting roller by screws 25ª (see Fig. 6).

For intermittently rotating the dough twisting rollers, with those of one set rotating in a direction opposite to the direction of rotation of the other set, segmental drive members 27, 28 are provided, which are rigidly mounted upon a shaft 29 journaled in bearings 30 carried by the side frame members. The segmental drive members are preferably formed with diametrically opposed drive segments 31, 32 which have friction drive faces on their peripheral edges. The drive segments 31 of the segmental drive member 27 are arranged to frictionally engage the friction roller 33 (see Fig. 4) which is rigidly connected to one of the dough twisting rollers 14, and the drive segments 32 of the segmental drive member 28 being arranged to frictionally engage a friction idler 34 (see Fig. 5), which frictionally engages with the friction roller 35 which is rigidly connected with one of the twisting rollers 15. The friction idler 34 serves to reverse the direction of rotation of the rollers 15 with respect to the direction of rotation of the rollers 14. The friction idler 34 is rotatively mounted on a stud shaft 36 (see Fig. 7) carried by a boss 37 formed on one side member 8 and is held against longitudinal movement on said stud shaft 36 by collars 38 fastened to the shaft. The leading ends of the drive segments 31, which engages the friction roller 33, are set slightly in advance of the leading ends of the drive segments 32 that engage the idler 34 because the idler is set slightly behind the friction roller 33, and, by advancing the leading ends of the drive segments 31, both sets of dough twisting members are set into motion at the same instant. The segmental drive members 27, 28 rotate in the direction of the adjacent arrows (see Figs. 4 and 5) and rotate the dough twisting members of the two sets in the directions indicated by the adjacent arrows in the same figures. Each drive segment 31, 32 is made of sufficient extent to rotate the dough twisting rollers through the required number of revolutions to effectively twist the dough rolls together, and the gap between the drive segments of each segmental drive member is of sufficient extent to permit the twisting rollers to remain quiescent for a sufficient length of time to permit the manual removal of the twisted dough rolls and the placing of other untwisted dough rolls on the twisting mechanism.

The segmental drive members are driven from an electric motor 40 or other source of power by speed reducing gearing 39 driven by the motor, and a belt 41 trained around a pulley 42 of the speed reducing gearing, and around a pulley 43 on the shaft 29 which carries the segmental drive members. Desirably, speed reducing gearing having adjustment means for varying the output speed of the gearing is employed.

Novel means are provided to feed two or more untwisted dough rolls to the twisting mechanism during the interval that said mechanism is quiescent and preferably at a time just prior to the resumption of operation by the twisting mechanism. The feed mechanism will now be described:

Between the apron 13 and the dough twisting mechanism is an oscillatory gate 44 which is formed with a part 45 normally aligned with the apron and forming a continuation thereof, an upstanding gate portion 46 and a segmental tail piece 47. The gate is secured to arms 48 mounted on a rock shaft 49 journaled in the frame members 8 at a place slightly above and at the rear of the dough twisting mechanism. Normally, the gate assumes the position shown in Fig. 1 and the dough rolls, discharging from the molding machine, roll down the apron one at a time and lodge upon the part 45 of the gate and are held back by the part 46 until the proper time to deliver two or more dough rolls, as the case may be, to the twisting mechanism.

To the shaft 49 is secured an arm 50 (see Fig. 1) which is connected to one arm of a lever 51 by a link 52. The lever 51 is fulcrumed at 53 upon one of the side frame members by a bolt or the like, and its other end projects into the path of rollers 54 that are carried by the two drive segments 31 of the segmental drive member 27. A spring 51ª secured to the lever 51 and to the frame, serves to restore the lever, gate and associated parts to normal position and a suitable stop arrests the gate at its normal position against the action of the spring. The rollers 54 are located adjacent the leading ends of the drive segments 31, and, as each drive segment 31 approaches the friction roller 33, the roller 54 encounters the lever 51, swings it upon its fulcrum, thereby drawing down the link 52, swinging the gate 44 in the direction of the adjacent arrows, and thereby discharging the collected untwisted rolls into the trough between the twisting elements and at the same time raising the segmental tail piece 47, and thereby preventing other dough rolls from rolling down beyond the lower edge of the apron.

As the roller 54 runs off the lever 51, the spring 51ª restores the gate and parts associated therewith to normal position (see Fig. 1). Directly after the roller 54 runs off the lever 51, the leading ends of the drive segments 31, 32, engage the friction roller 33 and friction idler 34 respectively, and, as a result, the dough twisting rollers are rotated in their respective directions until the drive segments run off the roller 33 and idler 34, thereby permitting the dough twisting rollers to become quiescent until the opposite drive segments come into action. During the quiescent period, the attendant grasps the twisted-together dough rolls near their ends, lifts them out of the trough between the rollers, and lays them into a baking pan.

In the operation of the machine, rolls of dough are delivered to the apron 13 and roll down the same to the gate 44 where two or more, as required, collect before they are delivered to the twisting mechanism.

Assuming the parts to be in the position seen in Fig. 1 with the segmental drive members rotating in the direction of the adjacent arrows, two or more untwisted dough rolls have been delivered into the trough between the dough twisting rollers and the drive segments are about to engage the friction roller 33 and friction idler 34. As the segmental drive members continue to rotate, one set of drive segments rotate said friction roller 33 and friction idler 34, thereby rotating the twisting rollers of the two sets, and rotating the rollers of one set in one direction and those of the other set in the opposite direction, whereby the dough rolls are twisted together. When the ends of the drive segments run off the friction roller 33 and friction idler 34, the dough twisting rollers are left quiescent and the attendant takes hold of the twisted dough rolls, lifts them from the twisting mechanism and places them in a pan.

The continued rotation of the segmental drive members brings the roller 54 of the opposite drive segment into engagement with the lever 51, thereby tilting the gate and discharging the untwisted dough rolls, which have collected thereon, into the trough between the twisting rollers, and as the roller 54 runs off the lever 51, the spring 51ª restores the gate and associated parts to normal position and the leading ends of the drive segments engage the friction roller 33 and friction idler 34, and again rotate the dough twisting rollers as before, and this sequence of operation is continued so long as the machine is in operation.

The speed reducing gearing is adjusted so as to synchronize the timing of the dough twisting machine with the timing of the molding machine, in order that the required number of dough rolls may be delivered to the twisting mechanism during each operation of the machine.

I claim as new and desire to secure by Letters Patent:

1. A dough twisting machine comprising in combination two oppositely disposed sets of rotating dough twisting rollers mounted to rotate at fixed locations on stationary axes and intermittently acting, driving mechanism for intermittently rotating the dough twisting rollers, those of one set being rotated in one direction and those of the opposite set in an opposite direction.

2. A dough twisting machine comprising in combination two oppositely disposed sets of rotatory dough twisting rollers mounted to rotate at fixed locations on stationary axes, the rollers of one set being aligned with those of the other set, and the rollers of both sets being arranged around a common axis to form a trough in which untwisted dough rolls are received, and intermittently acting, driving mechanism to intermittently rotate said dough twisting rollers, with those of one set rotating in a direction opposite to the direction of rotation of the rollers of the other set.

3. A dough twisting machine comprising in combination two oppositely disposed sets of rotatory dough twisting rollers mounted to rotate at fixed locations on stationary axes, gearing between the rollers of each set for causing them to rotate in unison in one and the same direction, segmental drive members, one for each set of rollers and arranged to rotate said rollers, and direction-reversing means between one of said segmental drive members and its associated set of rollers.

4. A dough twisting machine comprising in combination two oppositely disposed sets of rotatory dough twisting rollers mounted to rotate at fixed locations on stationary axes, gearing between the rollers of each set for causing them to rotate in one and the same direction, friction rollers, one connected to a dough twisting roller, of each set, a direction-reversing friction idler engaging one of said friction rollers, and segmental friction drive members, one arranged to engage said friction idler of one set and one arranged to engage the friction roller of the other set.

5. A dough twisting machine comprising in combination two oppositely disposed sets of dough twisting rollers mounted to rotate at fixed locations on stationary axes, gearing between the rollers of each set for causing them to rotate in one and the same direction, friction rollers, one connected to a dough twisting roller of each set, a direction reversing friction idler engaging one of said friction rollers, and segmental friction drive members, each formed with oppositely disposed drive segments having gaps between their ends and arranged to respectively engage the friction idler of one set and friction roller of the other set.

6. In a dough twisting machine, two sets of oppositely disposed dough twisting rollers, comprising a disc-like end wall provided with a hub whereby it may be rotatively mounted on a rod, and a plurality of closely spaced circumferentially arranged fingers projecting from said end wall toward the opposite roller in directions parallel with the axis upon which the roller is rotated, and means to rotate the rollers of one set in one direction and those of the other set in the opposite direction.

FRANK STREICH.